Figure 1:
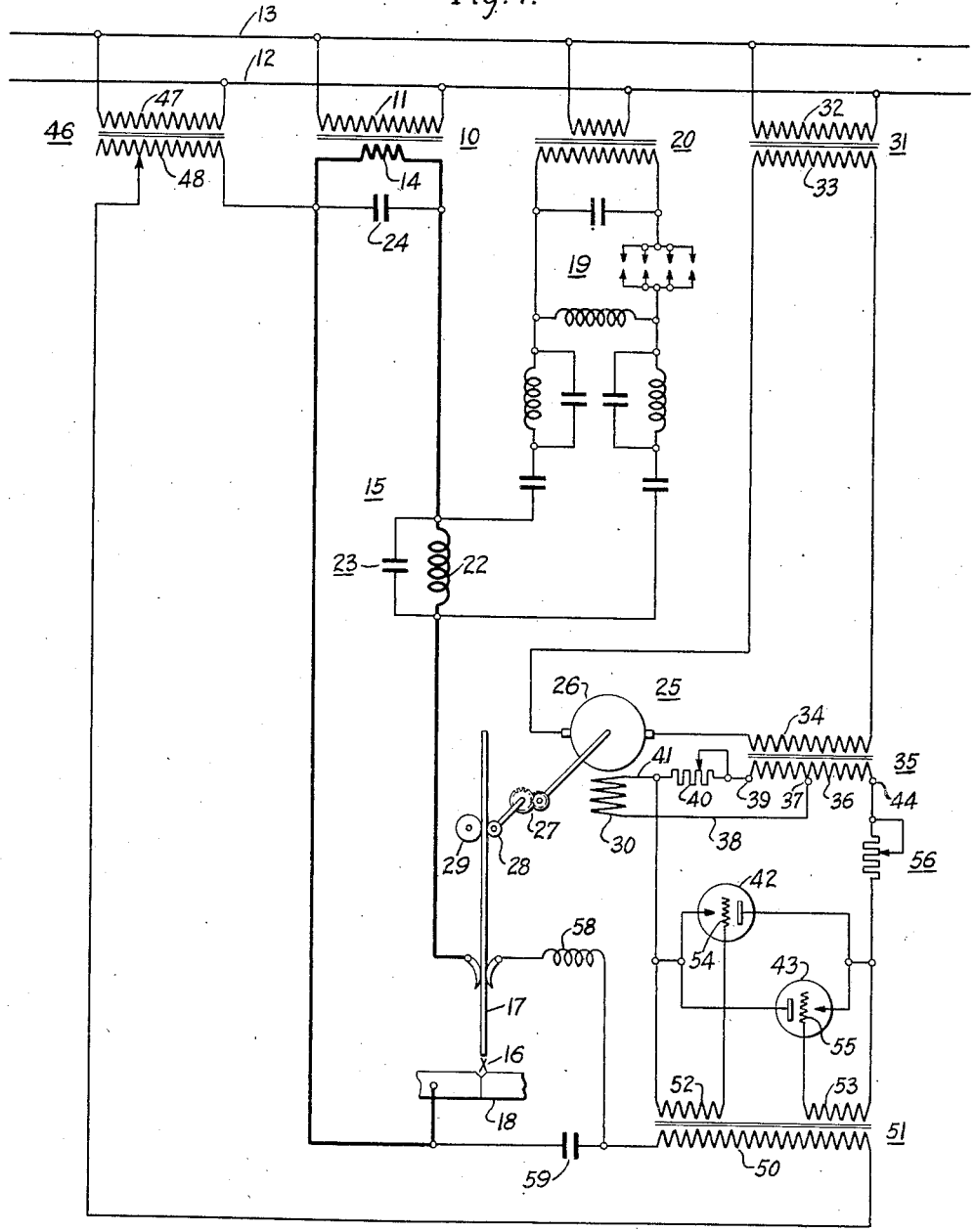

Nov. 27, 1934.   L. R. SMITH   1,982,327
ARC WELDING APPARATUS
Filed June 21, 1933   2 Sheets-Sheet 1

WITNESSES:
Leon J. Taza
R R Lockwood

INVENTOR
Lewis R. Smith
BY
G M Crawford
ATTORNEY

Patented Nov. 27, 1934

1,982,327

UNITED STATES PATENT OFFICE 1,982,327

ARC WELDING APPARATUS

Lewis R. Smith, Pittsburgh, Pa., assignor to Westinghouse Electric & Manufacturing Company, East Pittsburgh, Pa., a corporation of Pennsylvania Application June 21, 1933, Serial No. 676,812

18 Claims. (Cl. 219—8)

My invention relates, generally, to arc welding apparatus, and it has particular relation to automatic arc welding apparatus.

The object of my invention, generally stated, is to provide automatic arc welding apparatus which shall be simple and efficient in operation, and which may be readily manufactured and installed.

The principal object of my invention is to provide for controlling the rate at which an alternating current motor feeds an electrode relative to work on which a welding operation is to be performed so that a substantially constant arc voltage will be maintained therebetween.

Another object of my invention is to provide for controlling the current flow through one of the windings of an alternating current motor, which is used for feeding a welding electrode, in accordance with the voltage maintained across an alternating current arc.

Still another object of my invention is to provide for reversing the current flow through one of the windings of an alternating current motor, which is used for feeding a welding electrode, in accordance with the voltage maintained across an alternating current arc.

A further object of my invention is to provide for controlling the current flow through the field winding of a motor of the alternating current series type in accordance with the difference between a standard alternating current voltage and a voltage which is maintained across a welding electrode and work on which a welding operation is to be performed, in order to provide for feeding the electrode by the motor to maintain a substantially constant alternating current arc voltage therebetween.

A still further object of my invention is to provide for connecting a field winding of a motor of the alternating current series type in effective series circuit relation with the armature, in order to provide for the control of the current flow through the field winding in accordance with an alternating current arc voltage.

Still another object of my invention is to provide for controlling the current flow through one winding of a motor of the alternating current series type by means of space discharge devices in accordance with an alternating current voltage maintained across an arc welding electrode and work on which a welding operation is to be performed, in order to control the operation of the motor to feed the electrode for maintaining the arc voltage substantially constant.

Another object of my invention is to provide for preventing high-frequency oscillations, applied to an alternating current welding arc for the purpose of stabilizing its operation, from entering the control apparatus which is used for controlling the rate at which a welding electrode is fed to maintain the arc.

Other objects of my invention will, in part, be obvious and, in part, appear hereinafter.

My invention, accordingly is disclosed in the embodiment hereof shown in the accompanying drawings and comprises the features of construction, combination of elements, and arrangements of parts which will be exemplified in the construction hereinafter set forth, and the scope of the application of which will be indicated in the appended claims.

Figure 2:
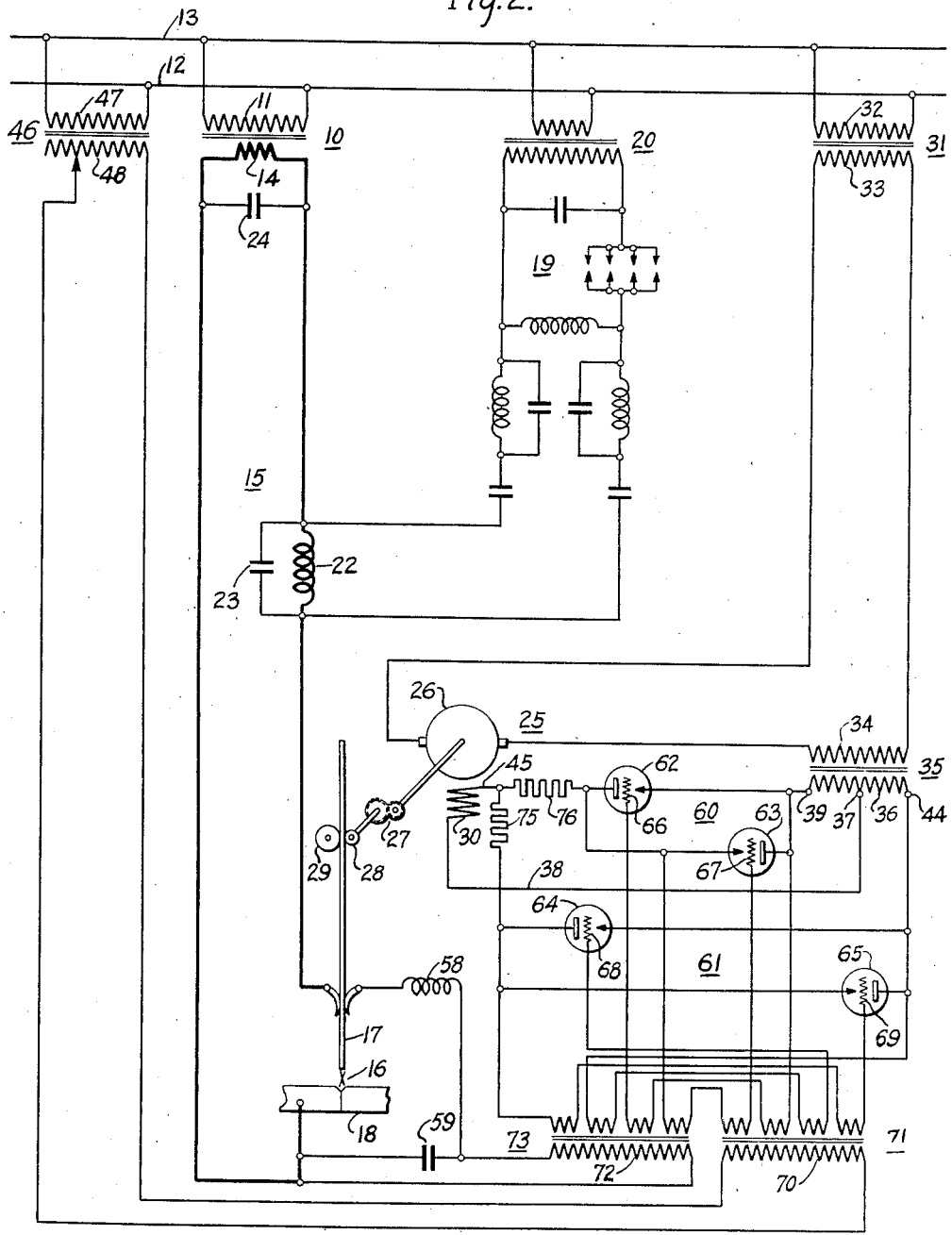

For a more complete understanding of the nature and scope of my invention, reference may be had to the following detailed description, taken in connection with the accompanying drawings, in which:

Figure 1 is a diagrammatic view of an automatic alternating current arc welding system organized in accordance with my invention; and, Fig. 2 is a diagrammatic representation of a modification of the automatic alternating current arc welding system illustrated in Fig. 1.

Referring now particularly to Fig. 1 of the drawings, the reference character 10 designates, generally, a welding transformer having a primary winding 11 connected to be energized from supply conductors 12 and 13 which may be connected to any suitable source of alternating current, such as a 60-cycle source. As illustrated, the transformer 10 is provided with a secondary winding 14 which is connected to energize a welding circuit illustrated generally at 15 for maintaining a welding arc 16 between a welding electrode 17 and work 18 on which a welding operation is to be performed.

In order to stabilize the operation of the welding arc 16, a high-frequency oscillation generator, illustrated generally at 19, is provided and may be energized from conductors 12 and 13 by means of a step-up transformer, illustrated generally at 20, in the customary manner. The high-frequency generator 19 is connected to apply high-frequency oscillations across an inductor 22 and a capacitor 23 which are connected in series circuit relation with the welding circuit 15, as illustrated.

A capacitor 24 is provided for shunting the high-frequency oscillations around the secondary winding 14 of the transformer 10. It will be readily understood that the high-frequency oscillations are provided for overcoming the tendency of the alternating current arc 16 to be extinguished whenever the current passes through the zero point of the current wave. The high-frequency oscillations provide a continuously ionized path so that the alternating current arc 16 may be continually maintained during normal operation of the system.

In order to feed the welding electrode 17 relative to the work 18 so that the alternating current arc 16 may be maintained, a motor, illustrated generally at 25, is provided having an armature 26 which is connected through suitable reduction gearing 27 to drive a feed roll 28 that is disposed in driving engagement with the welding electrode 17. An idler roller 29 is provided for cooperating with the feed roller 28. The motor 25 is preferably of the alternating current series type and is provided with a series field winding 30 which, however, is not directly connected in series circuit relation with the armature 26.

Energy for operating the motor 25 may be obtained from the conductors 12 and 13 through a transformer, shown generally at 31, having a primary winding 32 connected, as illustrated, to the conductors 12 and 13, and a secondary winding 33. The secondary winding 33 is connected across the armature 26, through a primary winding 34 of a series transformer, illustrated generally at 35. The series transformer 35 is provided with a secondary winding 36 having a tap 37 which may be located at a mid-point between the terminals of the secondary winding 36.

As illustrated, the tap 37 is connected by means of a conductor 38 to one terminal of the series field winding 30, while another terminal 39 of the secondary winding 36 is connected, through a potentiometer 40, to the other terminal 41 of the series field winding 30.

It will readily be apparent that the series field winding 30 is connected in effective series circuit relation with the armature 26 so that the motor 25 will operate as an ordinary motor of the alternating current series type. The only modification from the standard circuit connection is found in the interposition of the series transformer 35 between the circuit including the armature 26 and the series field winding 30. It will be readily understood, however, that the proper relation between the flux generated by the series field winding 30 and the current in the armature 26 will be maintained so that the normal torque characteristics of a motor of the alternating current series type will be obtained. It is pointed out, however, that the series transformer 35 and the particular connections of the secondary winding 36 to the series field winding 30 have been provided in order to permit the reversal of the current flow through the series field winding 30, in order to control the direction and speed of rotation of the motor 25, as will be hereinafter set forth.

With a view to reversing the current flow through the series field winding 30, space discharge devices 42 and 43 of the cold cathode type are provided. It will be readily apparent, however, that other types of space discharge devices may be used and that this invention may be practiced with the use of space discharge devices of other types. It will be observed that the space discharge devices 42 and 43 are oppositely connected, so that a full wave of alternating current may be conducted through both of them when they are considered as a single unit.

It will be observed that the space discharge devices 42 and 43 are connected between terminal 44 of the series transformer 35 and terminal 41 of the series field winding 30. It will then be apparent that when the space discharge devices 42 and 43 are rendered conducting the potential applied between the tap 37 and the terminal 44 of the secondary winding 36 will be impressed across the series field winding 30. This voltage is adjusted to be greater than the voltage impressed across the series field winding 30 by the section of the secondary winding 36 between the terminal 39 and the tap 37 through resistor 40. It will then be understood that with a reversal of the current flow through the series winding 30, while the current flow through the armature 26 is maintained in the same direction, the direction of rotation of the armature 26 will be reversed.

It is desirable to control the operation of the motor 25 in accordance with the difference between a standard voltage and the voltage which is maintained across the welding electrode 17 and the work 18. For this purpose a transformer, illustrated generally at 46, is provided having a primary winding 47 connected to be energized from conductors 12 and 13 and a secondary winding 48 having one terminal connected to the work 18, as illustrated, and a second terminal adjustable along the secondary winding 48 to provide any desired standard voltage.

The standard voltage obtained from the secondary winding 48 is impressed across a primary winding 50 of a transformer, illustrated generally at 51, having secondary windings 52 and 53 which are connected to grids 54 and 55 of space discharge devices 42 and 43, respectively. It will be understood that the secondary winding 48 and the primary winding 50 are subtractively connected, so that the voltage appearing across the secondary windings 52 and 53 is a function of the difference in voltage between that appearing across the secondary winding 48 and the voltage which is maintained across the welding electrode 17 and the work 18 by means of the welding transformer 10.

An additional potentiometer 56 may be provided for regulating the current flow through the space discharge devices 42 and 43, as illustrated.

In order to prevent the high-frequency oscillations generated by the generator 19 from entering the control circuits for the motor 25, an inductor 58 or high-frequency choke coil is provided in series circuit relation with the primary winding 50 of the transformer 51 and a capacitor 59 is connected in shunt circuit relation with one terminal of the inductor 58 and the work 18, so that the high-frequency oscillations, applied to stabilize the operation of the welding arc 16, are effectively filtered out.

In operation, assuming that conductors 12 and 13 are energized from a suitable source of alternating current, and that the welding electrode 17 is out of arcing engagement with the work 18, the voltage across the electrode 17 and the work 18 will be relatively high. This voltage will, in fact, be the open-circuit voltage of the secondary winding 14 of the welding transformer 10. This voltage may be opposed by the standard voltage obtained from the secondary winding 48 of the transformer 46 to such an extent that the space discharge devices 42 and 43 are rendered non-conducting by the application of a suitable potential to the grids 54 and 55. The motor 25 will then be operated in such direction as to cause the armature 26 to feed the welding electrode 17 toward the work 18 until it is in contact engagement therewith. When the welding electrode 17 engages the work 18, the voltage across them drops to a very low value, while the standard voltage obtained from the secondary winding 48 of the transformer 46 remains substantially constant. A proper biasing voltage will then be applied to the grids 54 and 55 to render the space discharge devices 42 and 43 conducting. The current flow through the series field winding 30 will then be reversed and, as has been set forth hereinbefore, the direction of rotation of the armature 26 will be reversed. The welding electrode 17 will then be withdrawn from the work 18 and the arc 16 formed therebetween. The voltage across the welding electrode 17 and the work 18 then rises to such value that the voltage applied to bias the grids 54 and 55 is removed, so that the space discharge devices 42 and 43 become non-conducting. The direction of rotation of the armature 26 is again reversed to forwardly feed the welding electrode 17. It will be readily apparent that the arrangement of the circuits may be so adjusted that the welding electrode 17 may be fed by the motor 25, so that the voltage of the arc 16 will be maintained substantially constant.

While it may be preferable to connect the motor 25, as illustrated, it will be readily understood that the connections of the armature 26 and the series field winding 30 may be interchanged, so that the current flow through the armature 26 is reversed to obtain a reversal in the direction of rotation thereof, while the current flow through the series field winding 30 is maintained relatively in the same direction. It will also be apparent that the space discharge devices 42 and 43 may be rendered conducting when the voltage across the welding electrode 17 and the work 18 is relatively high, and non-conducting when the welding electrode 17 is in contact engagement with the work 18.

Referring now particularly to Fig. 2 of the drawings, it will be observed that two pairs of space discharge devices 60 and 61 are provided for controlling the current flow through the series field winding 30. The pair 60 comprises oppositely connected space discharge devices 62 and 63, while pair 61 comprises oppositely connected space discharge devices 64 and 65. The space discharge devices 62 through 65 are respectively provided with grids 66 through 69.

It will be observed that the standard voltage obtained from the secondary winding 48 of the transformer 46 is applied to a primary winding 70 of a transformer, illustrated generally at 71, while the voltage across the welding electrode 17 and the work 18 is applied to a primary winding 72 of a transformer, illustrated generally at 73. In order to obtain a voltage which is a function of the difference between the standard voltage obtained from the secondary winding 48 and the voltage maintained across the welding electrode 17 and the work 18, the transformers 71 and 73 are provided with a plurality of secondary windings, each individual to one of the grids 66 through 69 and each connected in series circuit relation with a corresponding secondary winding on the other transformer, as illustrated. It will then be apparent that the difference in voltage for controlling the functioning of the space discharge devices 62 through 65 will be applied to the grids 66 through 69.

In order to prevent the short circuiting of the secondary winding 36 of the series transformer 35, resistors 75 and 76 are provided so that even if all of the space discharge devices 62 through 65 happen to become conducting, no serious results will occur.

In operation, assuming that the proper alternating current potential is applied to conductors 12 and 13 and that the welding electrode 17 is out of arcing engagement with the work 18, one or the other of the pairs of space discharge devices 60 and 61 will be rendered conducting, depending upon the adjustment of the circuits, to energize the series field windings in a direction such as to cause the armature 26 to rotate in a direction to feed the electrode 17 toward the work 18 until it engages therewith. At this time, the voltage across the welding electrode 17 and the work 18 drops to a relatively low value so that the other pair of space discharge devices 61 and 60, which was not previously rendered conducting, now becomes conducting to reverse the current flow through the series field winding 30, while the pair of space discharge devices which was previously conducting is now rendered non-conducting.

The reversal of armature 26 causes the welding electrode 17 to be retracted until the voltage across the welding electrode 17 and the work 18 is such as to render the corresponding pair of space discharge devices non-conducting. The other pair of space discharge devices then become conducting to cause the motor 25 to forwardly feed the welding electrode 17. It will then be readily understood that the welding electrode 17 will be fed by the motor 25 so that the arc 16 is maintained at a substantially constant arc voltage.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. An automatic arc welding system comprising, in combination, a source of alternating current connected to maintain an arc between a welding electrode and work on which a welding operation is to be performed, an alternating current motor having driving connection with said electrode for feeding it relative to said work, said motor including a pair of operating windings, a transformer having a primary winding connected in series circuit relation with one of said operating windings and a secondary winding connected to excite said other operating winding, and control means connected to be responsive to the voltage maintained across said electrode and work and to regulate the current flow through said last named operating winding for controlling the rate in accordance therewith at which said electrode is fed relative to said work by said alternating current motor.

2. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with one of said motor windings and a secondary winding connected to excite said other motor winding, and control means connected to be responsive to the voltage maintained across said electrode and work and to regulate the current flow through said last named motor winding for controlling the rate in accordance therewith at which said electrode is fed relative to said work by said alternating current motor.

3. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding connected to excite said field winding, the remaining terminals of said armature and primary winding being connected to said source of alternating current, and control means connected to be responsive to the voltage across said electrode and work and to regulate the current flow through said field winding for controlling the rate in accordance therewith at which said electrode is fed relative to said work by said alternating current motor.

4. An automatic arc welding system comprising, in combination, a source of alternating current connected to maintain an arc between a welding electrode and work on which a welding operation is to be performed, an alternating current motor having driving connection with said electrode for feeding it relative to said work, said motor including a pair of operating windings connected in effective series circuit relation to said source of alternating current, and control means comprising space discharge means connected to become conducting in response to the application of a predetermined voltage across said electrode and work and to regulate the current flow through one of said windings for controlling the rate in accordance therewith at which said electrode is fed relative to said work by said alternating current motor.

5. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding connected in effective series circuit relation to said source of alternating current, and control means comprising space discharge means connected to become conducting in response to the application of a predetermined voltage across said electrode and work and to regulate the current flow through said field winding for controlling the rate in accordance therewith at which said electrode is fed relative to said work by said alternating current motor.

6. An automatic arc welding system comprising in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding connected to excite said field winding, the remaining terminals of said armature and primary winding being connected to said source of alternating current, and control means comprising space discharge means connected to become conducting in response to the application of a predetermined voltage across said electrode and work and to regulate the current flow through said field winding for controlling the rate in accordance therewith at which said electrode is fed relative to said work by said alternating current motor.

7. An automatic arc welding system comprising, in combination, a source of alternating current connected to maintain an arc between a welding electrode and work on which a welding operation is to be performed, an alternating current motor having driving connection with said electrode for feeding it relative to said work, said motor including a pair of operating windings connected in effective series circuit relation to said source of alternating current, and control means connected to be responsive to the difference between the voltage maintained across said electrode and work and a standard voltage obtained from said source of alternating current to regulate the current flow through one of said windings for controlling the rate in accordance therewith at which said electrode is fed relative to said work by said alternating current motor.

8. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding connected in effective series circuit relation to said source of alternating current, and control means connected to be responsive to the difference between the voltage maintained across said electrode and work and a standard voltage obtained from said source of alternating current to regulate the current flow through said field winding for controlling the rate in accordance with said difference in voltage at which said electrode is fed relative to said work by said alternating current motor.

9. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding connected to excite said field winding, the remaining terminals of said armature and primary winding being connected to said source of alternating current, and control means connected to be responsive to the difference between the voltage maintained across said electrode and work and a standard voltage obtained from said source of alternating current to regulate the current flow through said field winding for controlling the rate in accordance with said difference in voltage at which said electrode is fed relative to said work by said alternating current motor.

10. An automatic arc welding system comprising, in combination, a source of alternating current connected to maintain an arc between a welding electrode and work on which a welding operation is to be performed, an alternating current motor having driving connection with said electrode for feeding it relative to said work, said motor including a pair of operating windings connected in effective series circuit relation to said source of alternating current, and control means comprising space discharge means connected to become conducting in response to a predetermined difference between the voltage maintained across said electrode and work and a standard voltage obtained from said source of alternating current to regulate the current flow through one of said windings for controlling the rate in accordance with said difference in voltage at which said electrode is fed relative to said work by said alternating current motor.

11. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding connected in effective series circuit relation to said source of alternating current, and control means comprising space discharge means connected to become conducting in response to a predetermined difference between a standard voltage obtained from said source of alternating current and the voltage maintained across said electrode and work to regulate the current flow through said field winding for controlling the rate in accordance with said difference in voltage at which said electrode is fed relative to said work by said alternating current motor.

12. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding connected to excite said field winding, the remaining terminals of said armature and primary winding being connected to said source of alternating current, and control means comprising space discharge means connected to become conducting in response to a predetermined difference between a standard voltage obtained from said source of alternating current and the voltage maintained across said electrode and work to regulate the current flow through said field winding for controlling the rate in accordance with said difference in voltage at which said electrode is fed relative to said work by said alternating current motor.

13. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding having a plurality of sections, the remaining terminals of said primary winding and armature being connected to said source of alternating current, circuit means including a resistor connecting said field winding to one of the sections of said secondary winding for effecting the operation of said motor in one direction, and control means connected to be responsive to the voltage across said electrode and work for connecting another section of said secondary winding to said field winding when a predetermined voltage exists across said electrode and work to reverse the current flow through said field winding and thereby reverse the direction of rotation of said motor.

14. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding having a plurality of sections, the remaining terminals of said primary winding and armature being connected to said source of alternating current, circuit means including a resistor connecting said field winding to one of the sections of said secondary winding for effecting the operation of said motor in one direction, and control means comprising space discharge means connected to become conducting in response to the application of a predetermined voltage across said electrode and work for connecting another section of said secondary winding to said field winding whereby the direction of current flow through said field winding and rotation of said armature is reversed.

15. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding having a tap, the remaining terminals of said primary winding and armature being connected to said source of alternating current, circuit means connecting the tap on said secondary winding to one terminal of said field winding and the remaining terminal of said field winding in series circuit relation with a resistor to one of the terminals of said secondary winding, thereby causing said armature to rotate in one direction, a pair of reverse connected space discharge devices interposed between said last-named terminal of the field winding and the remaining terminal of said secondary winding, and control means connected for rendering said space discharge devices conducting when a predetermined voltage exists across said electrode and work whereby the direction of current flow through said field winding and rotation of said armature is reversed.

16. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding having a plurality of sections, the remaining terminals of said primary winding and armature being connected to said source of alternating current, circuit means including a resistor connecting said field winding to one of the sections of said secondary winding for effecting the operation of said motor in one direction, and control means comprising space discharge means connected to become conducting in response to the application of a predetermined difference between a standard voltage obtained from said source of alternating current and the voltage maintained across said electrode and work for connecting another section of said secondary winding to said field winding whereby the direction of current flow through said field winding and rotation of said armature is reversed.

17. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding having a mid-tap connected to one terminal of said field winding, the remaining terminals of said primary winding and armature being connected to said source of alternating current, a pair of reverse-connected space discharge devices interconnected between each of the terminals of said secondary winding and the remaining terminal of said field winding, and control means connected for rendering either of said pairs of space discharge devices conducting in accordance with the voltage across said electrode and work whereby the direction of current flow through said field winding and rotation of said armature is controlled to feed said electrode relative to said work to maintain a predetermined arc voltage therebetween.

18. An automatic arc welding system comprising, in combination, a source of alternating current connected to maintain an arc between a welding electrode and work on which a welding operation is to be performed, an alternating current motor having driving connection with said electrode for feeding it relative to said work, said motor including an armature and a field winding, a transformer having a primary winding connected in series circuit relation with said armature and a secondary winding having a mid-tap connected to one terminal of said field winding, the remaining terminals of said primary winding and armature being connected to said source of alternating current, a pair of reverse connected space discharge devices inter-connected between each of the terminals of said secondary winding and the remaining terminal of said field winding, and control means connected for rendering either of said pairs of space discharge devices conducting in accordance with a predetermined difference between a standard voltage obtained from said source of alternating current and the voltage maintained across said electrode and work whereby the direction of current flow through said field winding and rotation of said armature is controlled to feed said electrode relative to said work to maintain a predetermined arc voltage therebetween.

LEWIS R. SMITH.